(12) United States Patent
Koga

(10) Patent No.: US 9,431,669 B2
(45) Date of Patent: Aug. 30, 2016

(54) FUEL CELL SYSTEM AND STOP METHOD THEREOF

(71) Applicant: HONDA MOTOR CO., LTD., Tokyo (JP)

(72) Inventor: Futoshi Koga, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 810 days.

(21) Appl. No.: 13/645,670

(22) Filed: Oct. 5, 2012

(65) Prior Publication Data

US 2013/0095403 A1    Apr. 18, 2013

(30) Foreign Application Priority Data

Oct. 14, 2011    (JP) .................... 2011-226766

(51) Int. Cl.
*H01M 8/04223* (2016.01)
*H01M 8/04* (2016.01)

(52) U.S. Cl.
CPC ..... *H01M 8/04231* (2013.01); *H01M 8/04388* (2013.01); *H01M 8/04955* (2013.01); *Y02E 60/50* (2013.01)

(58) Field of Classification Search
None
See application file for complete search history.

(56) References Cited

U.S. PATENT DOCUMENTS

| | | | |
|---|---|---|---|
| 2008/0075986 A1* | 3/2008 | Salvador | ........... H01M 8/04223 429/410 |
| 2012/0077102 A1* | 3/2012 | Morita | ............. H01M 8/04388 429/429 |

FOREIGN PATENT DOCUMENTS

| | | |
|---|---|---|
| JP | 2003-331893 A | 11/2003 |
| JP | 2008-078140 A | 4/2008 |
| WO | WO 2005/062148 | * 7/2005 |

* cited by examiner

*Primary Examiner* — Sarah A Slifka
(74) *Attorney, Agent, or Firm* — Squire Patton Boggs (US) LLP

(57) ABSTRACT

A fuel cell system and a stop method thereof are provided that can supply inert gas to the anode with a simple configuration during system stop. The method includes the steps of: cutting off new supply of fuel gas to the anode and discharge of discharge gas from the anode to outside after a stop command for the system (S1 and S2); continuing electric power generation by way of the stack in a state in which the supply and discharge of gas is cut off according to the step of cutting off (S3 to S12); storing, in a $N_2$ storage portion, gas discharged to an air discharge line in the step of continuing (Steps S8 to S10); and introducing inert gas stored inside of the $N_2$ storage portion to inside of a hydrogen supply line, after the step of continuing (S13 to S17).

7 Claims, 4 Drawing Sheets

FUEL CELL SYSTEM AND STOP METHOD THEREOF

This application is based on and claims the benefit of priority from Japanese Patent Application No. 2011-226766, filed on 14 Oct. 2011, the content of which is incorporated herein by reference.

BACKGROUND OF THE INVENTION

1. Field of the Invention

The present invention relates to a fuel cell system and a stop method thereof.

2. Related Art

For fuel cell systems that cause electric power to be generated by a fuel cell by way of supplying hydrogenous fuel gas to the anode of the fuel cell and supplying oxygenated oxidizing gas to the cathode, a technology has been proposed for discharging (scavenging) residual hydrogen to outside of the system by supplying oxidizing gas to the anode during shutdown of the system (refer to Japanese Unexamined Patent Application, Publication No. 2003-331893). This is in order to prevent the electrolyte membrane of the fuel cell from deteriorating by oxygen that has permeated from the cathode side to the anode side and the hydrogen remaining on the anode side mixing and radicals being produced during shutdown of the system.

However, if the anode is scavenged with oxidizing gas as in Patent Application, Publication No. 2003-331893, during shutdown, a state will be entered in which oxygenated oxidizing gas is filled into both the anode and cathode, and although oxygen and hydrogen will not mix, it has become clear in recent years that, when the system is activated from such a state filling both electrodes with oxidizing gas, a high potential will be generated and degradation of the electrolyte membrane will progress.

Therefore, Japanese Unexamined Patent Application, Publication No. 2008-78140 has proposed a technology for preventing a system from being reactivated from a state in which both electrodes are filled with oxidizing gas, by discharging residual hydrogen with nitrogen (inert) gas in place of oxidizing gas in the anode during shutdown of the system.

SUMMARY OF THE INVENTION

However, with the technology of Japanese Unexamined Patent Application, Publication No. 2008-78140, the above-mentioned nitrogen gas is purified by having the oxidizing gas pass through an oxygen adsorbent to remove the oxygen from the oxidizing gas. Therefore, in addition to the system increasing in size by equipping an oxygen adsorbent and the cost rising, there are problems such as time being consumed in regenerating the oxygen adsorbent in an appropriate period in order to restore the oxygen adsorption capacity. In addition, instead of purifying nitrogen gas in this way on a vehicle, it has been considered to store pre-purified nitrogen gas in a compressed gas cylinder and to use this when stopping the system; however, problems such as the system size increase and rising cost are not adequately resolved in this case either.

The present invention has an object of providing a fuel cell system and a stop method thereof that can supply inert gas to the anode with a simply configuration while stopping the system.

In order to the achieve the above-mentioned object, the present invention provides a fuel cell system (e.g., the fuel cell system 1, 1A described later) including: a fuel cell (e.g., the fuel cell stack 10 described later) that generates electric power by supplying fuel gas to an anode and oxidizing gas to a cathode; a fuel gas supply channel (e.g., the hydrogen supply line 22 described later) in which fuel gas supplied to the anode flows; an oxidizing gas supply channel (e.g., the air supply line 32 described later) in which oxidizing gas supplied to the cathode flows; a fuel gas discharge channel (e.g., the hydrogen recirculation line 23 described later) in which discharge gas from the anode flows; an oxidizing gas discharge channel (e.g., the air discharge line 33 described later) in which discharge gas from the cathode flows; a discharge gas storage portion (e.g., the $N_2$ storage portion 51 described later) that connects the oxidizing gas discharge channel and the fuel gas supply channel; a supply shutoff valve (e.g., the hydrogen shutoff valve 24 described later) that is provided to the fuel gas supply channel and cuts off new supply of fuel gas to the anode; a discharge shutoff valve (e.g., the hydrogen purge valve 28 and drain valve 29 described later) that is provided to the fuel gas discharge channel and cuts off discharge of discharge gas from the anode to outside of the system; a post-stop shutoff means (e.g., the ECU 60 and means related to execution of Steps S1 and S2 in FIG. 2 described later) for cutting off both supply and discharge of gas by way of the supply shutoff valve and the discharge shutoff valve, after a stop command for the fuel cell system; an electric power generation continuing means (e.g., the ECU 60 and means related to execution of Steps S3 to S12 described later) for continuing electric power generation by the fuel cell in a state in which the supply and discharge of gas are cut off by way of the post-stop shutoff means; and a discharge gas introduction means (e.g., the ECU 60 and means related to execution of Steps S4 to S17 described later) for introducing gas discharged to the oxidizing gas discharge channel while continuing electric power generation by way of the electric power generation continuing means, into the fuel gas supply channel via the discharge gas storage portion, after electric power generation by way of the electric power generation continuing means has ended.

With the present invention, after a stop command for the system, electric power generation is continued by the fuel cell in a state cutting off the supply and discharge of fuel gas. By continuing electric power generation in this way, the pressure on the anode side declines along with a decline in hydrogen concentration, and gas having a high nitrogen concentration on the cathode side is discharged to the oxidizing gas discharge channel. Furthermore, with the present invention, the gas discharged to the oxidizing gas discharge channel while continuing electric power generation is introduced to the fuel gas supply channel, which is at negative pressure after the end of the above-mentioned electric power generation, via the exhaust gas storage portion connecting the oxidizing gas discharge channel and the fuel gas supply channel. The hydrogen concentration and oxygen concentration thereby lower and the anode is filled by inert gas having a high nitrogen concentration, and thus it is possible to have the system stop in a state sealing the fuel gas supply channel and the fuel gas discharge channel; therefore, it is possible to prevent degradation due to oxygen mixing with hydrogen in the anode during system stop, and degradation due to reactivating the system in a state in which both electrodes are filled with oxidizing gas.

In addition, inert gas filling the anode was introduced from the oxidizing gas discharge channel using the negative pressure; therefore, it is possible to make the system stop in a state in which the cathode is also filled with the same inert gas as the anode. More specifically, the reaction from remaining gas will almost not progress in a state in which not only the anode, but also the cathode is filled with inert gas, and it has been verified to be particularly effective in suppressing degradation of the electrolyte membrane.

It should be noted that, after system stop, the inert gas being temporarily filled to the cathode side is gradually discharged out of the system, and finally comes to be replaced with oxidizing gas having a high oxygen concentration. However, even in such a case, while inert gas on the cathode side is replaced by oxidizing gas, it goes without saying that a state in which degradation is particularly effectively suppressed as described above is maintained; however, so long as the state in which the anode side is filled with inert gas is being maintained, the effect of suppressing degradation will not be impaired also after the inert gas has been replaced with oxidizing gas.

According to the present invention as described above, since the gas discharged from the cathode while continuing electric power generation after a stop command is appropriated as inert gas, there is no need to newly provide a device for generating inert gas. In particular, it has been verified that the oxygen concentration of the gas discharged from the fuel cell to the oxidizing gas discharge channel during electric power generation cutting off the supply and discharge of fuel gas and with a supply of very low flowrate oxidizing gas is sufficiently low compared to during normal electric power generation and is qualified as an inert gas. In addition, the required amount of inert gas for stopping is sufficient so long as appropriating the gas discharged by continuing electric power generation each time; therefore, since the volume of the exhaust gas storage portion is sufficient so long as the size corresponding to the required amount in stopping one time can be ensured, the effect on size reduction will also be great compared to such a nitrogen gas cylinder.

Furthermore, by continuing electric power generation in a state cutting off the supply and discharge of the anode side, the pressure of the anode at the end of the continuance of electric power generation will be sufficiently lower than the cathode side. Therefore, since it is possible to employ this negative pressure upon introducing the above-mentioned inert gas via the exhaust gas storage portion, devices such as a pump for supplying the gas of the exhaust gas storage portion against the pressure on the anode side also become especially unnecessary.

In this case, it is preferable for the fuel cell system to further include: a discharge gas purge channel (e.g., the $N_2$ purge line 52 described later) that branches from the discharge gas storage portion and communicates to outside of the system; and an oxygen concentration determination means (e.g., the ECU 60 and means related to execution of Step S7 in FIG. 2 described later) for determining whether an oxygen concentration of gas inside of the discharge gas storage portion is at least a predetermined value, in which the discharge gas introduction means discharges, out of the system, gas inside of the discharge gas storage portion via the discharge gas purge channel along with gas introduced from the oxidizing gas discharge channel, until the oxygen concentration is determined as being no more than a predetermined concentration.

With the present invention, upon introducing inert gas via the discharge gas storage portion to an anode side, the gas remaining inside of the discharge gas storage portion is discharged along with gas introduced from the oxidizing gas discharge channel out of the system via the exhaust gas purge channel, until the oxygen concentration of the gas inside of the discharge gas storage portion is determined as being no more than a predetermined concentration. It is thereby made so that only inert gas having a sufficiently low oxygen concentration is stored in the discharge gas storage portion, whereby it is possible to prevent oxygen from being introduced to the anode side.

In this case, it is preferable for the fuel cell system to further include an anode scavenging valve (e.g., the anode scavenging valve 54 described later) provided in a channel connecting the discharge gas storage portion and the fuel gas supply channel, in which the discharge gas introduction means fills discharge gas into the discharge gas storage portion in a state in which the anode scavenging valve is closed, and then opens the anode scavenging valve in response to a predetermined condition being satisfied, and introduces gas inside of the discharge gas storage portion into the fuel gas supply channel.

With the present invention, inert gas is filled to the discharge gas storage portion in a state in which the anode scavenging valve is closed, and the scavenging valve is opened in response to a predetermined condition having been satisfied, and the inert gas inside of the discharge gas storage portion is introduced into the fuel gas supply channel. By closing the anode scavenging valve and establishing a state in which the fuel gas supply channel and discharge gas storage portion are cut off until introducing gas into the fuel gas supply channel in this way, it is possible to cause a pressure differential to arise between the inside of the fuel gas supply channel and the discharge gas storage portion until opening the anode scavenging valve; therefore, inert gas can be introduced in a short time without using a new device.

In this case, it is preferable for the post-stop shutoff means to cut off discharge of discharge gas from the anode to outside of the system by way of the discharge shutoff valve in response to a stop command for the fuel cell system being inputted, then after pressure inside of the fuel gas supply channel becomes higher than a predetermined pressure (e.g., the discharge required pressure described later), to cut off new supply of fuel gas to the anode by way of the supply shutoff valve after pressure inside of the fuel gas supply channel becomes higher than a predetermined pressure.

With the present invention, after a stop command for the system, the pressure inside of the fuel gas supply channel becomes higher than a predetermined pressure, and then new supply of fuel gas to the anode is stopped. Although the pressure on the anode side gradually declines when continuing electric power generation as described above, by ensuring sufficient pressure when cutting off new supply of fuel gas, it is possible to prevent the pressure inside of the anode at the end of electric power generation from declining to an extent at which the fuel cell is damaged.

In this case, it is preferable for the fuel cell system to further include a compressor (e.g., the compressor 56A described later) that compresses gas inside of the oxidizing gas discharge channel and supplies to the discharge gas storage portion.

According to the present invention, it is possible to store a sufficient amount of inert gas for introducing to the anode side inside of the discharge gas storage portion, by filling the gas inside the oxidizing gas discharge channel into the discharge gas storage portion using a compressor. In addition, by using such a compressor, it is also possible to reduce the volume of the discharge gas storage portion.

In order to achieve the above-mentioned object, the present invention provides a method for stopping a fuel cell that includes a fuel cell that generates electric power by supplying fuel gas to an anode and supplying oxidizing gas to a cathode; a fuel gas supply channel in which fuel gas supplied to the anode flows; an oxidizing gas discharge channel in which discharge gas from the cathode flows; and a discharge gas storage portion that connects the oxidizing gas discharge channel and the fuel gas supply channel, in which the method includes the steps of: cutting off new supply of fuel gas to the anode and discharge of discharge gas from the anode to outside of the system after a stop command for the fuel cell system (e.g., Steps S1 and S2 in FIG. 2 described later); continuing electric power generation by way of the fuel cell in a state in which the supply and discharge of gas is cut off according to the step of cutting off (e.g., Steps S3 to S12 in FIG. 2 described later); storing, in the discharge gas storage portion, gas discharged to the oxidizing gas discharge channel in the step of continuing (e.g., Steps S5 to S10 described later); and introducing gas stored inside of the discharge gas storage portion to inside of the fuel gas supply channel, after the step of continuing (e.g., Steps S13 to S17 described later).

According to the present invention, after a stop command for the system, the gas discharged to the oxidizing gas discharge channel is stored in the exhaust gas storage portion as inert gas while continuing electric power generation, and this inert gas is introduced to the fuel gas supply channel, which is at negative pressure after the end of electric power generation. It is thereby possible to prevent degradation due to oxygen mixing with hydrogen inside the anode during system stop, and degradation due to reactivating the system in a state in which both electrodes are filled with oxidizing gas.

According to the present invention, it is not necessary to newly provide a device for generating inert gas, and there is a great effect on a size reduction compared to the aforementioned such nitrogen compressed gas cylinder. Furthermore, according to the present invention, since it is possible to introduce inert gas using the negative pressure, devices such as a pump for supplying the gas of the discharge gas storage portion against the pressure on the anode side also become especially unnecessary In this case, it is preferable for the supply and discharge to be cut off in the step of cutting off, in a case of pressure inside of the fuel gas supply channel having risen to a predetermined pressure.

According to the present invention, although the pressure on the anode side will gradually decline when continuing electric power generation, the pressure in the anode at the end of e electric power generation can be prevented from declining to an extent at which the fuel cell is damaged, by ensuring sufficient pressure upon cutting off the supply of new fuel gas.

In this case, it is preferable to further include a step of discharging gas discharged to the oxidizing gas discharge channel to outside of the system, in a period from starting the step of continuing until starting the step of storing (e.g., Steps S3 and S4 in FIG. 2 described later).

According to the present invention, by discharging the gas inside of the oxidizing gas discharge channel to outside of the system without storing in the discharge gas storage portion, immediately after the start of electric power generation continuation, at which the nitrogen concentration of the gas inside of the oxidizing gas discharge channel is considered to be relatively low, it is possible to store inert gas having a high nitrogen concentration in the discharge gas storage portion.

In this case, it is preferable for the introduction of gas inside of the discharge gas storage portion to be stopped in the step of introducing, in response to the pressure of the anode becoming substantially equal to pressure of the cathode.

According to the present invention, by introducing the inert gas inside of the discharge gas storage portion until the pressure of the anode and the pressure of the cathode become substantially equal, it is possible to prevent a differential pressure arising across the electrolyte membrane in the fuel cell and strain acting thereon during system stop.

DETAILED DESCRIPTION OF THE INVENTION

First Embodiment

Hereinafter, a first embodiment of the present invention will be explained while referencing the drawings.

Figure 1:
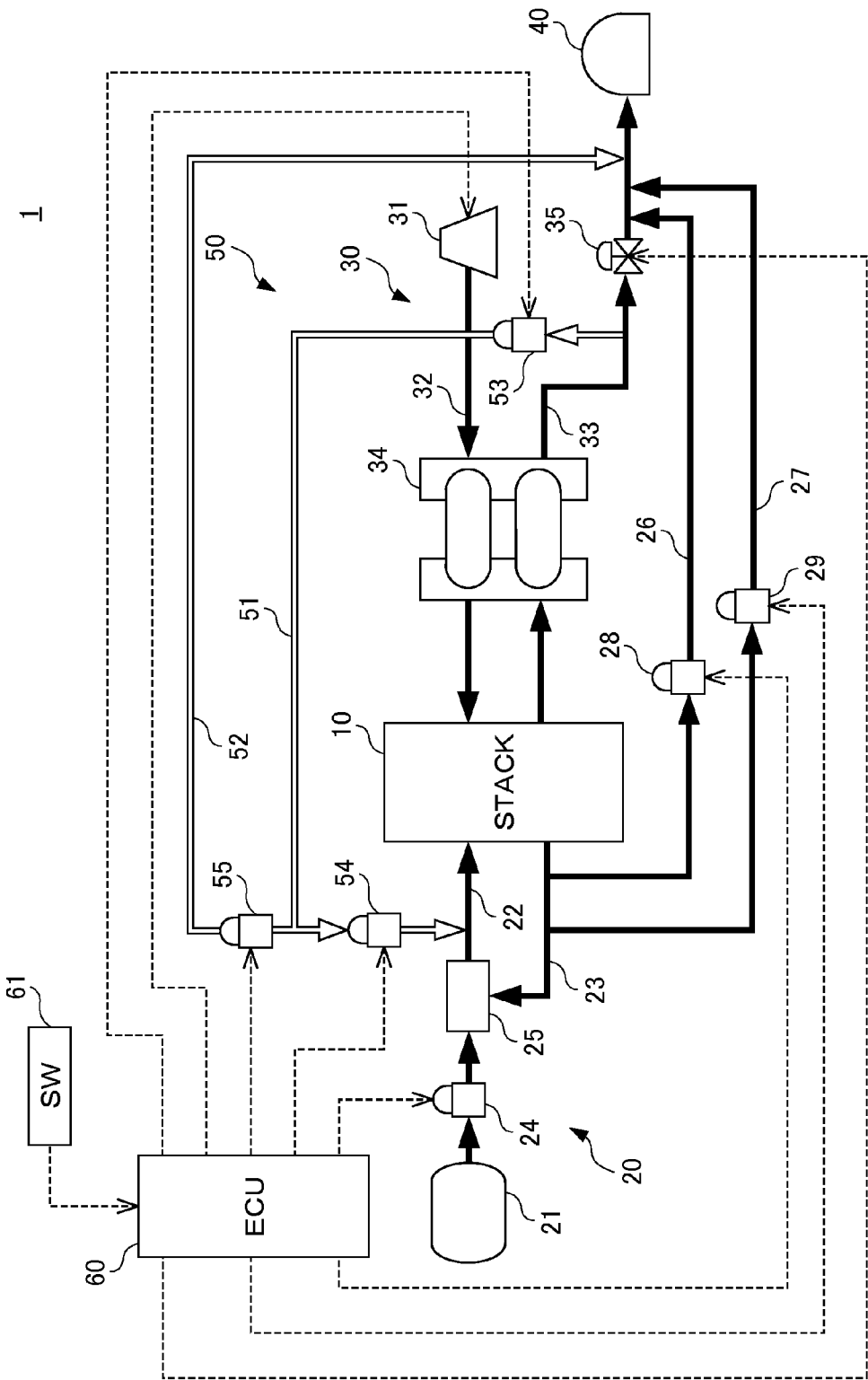
FIG. 1 is a block diagram schematically showing the configuration of a fuel cell system according to a first embodiment of the present invention.

FIG. 1 is a block diagram schematically showing the configuration of a fuel cell system 1 according to the present embodiment.

The fuel cell system 1 is configured to include a fuel cell stack 10, a hydrogen supply device 20 that supplies hydrogen gas to this fuel cell stack 10, an air supply device 30 that supplies air, an $N_2$ storage device 50 that connects with the air supply device 30 and the hydrogen supply device 20, a diluter 40 that dilutes gas discharged from the fuel cell stack 10 and discharges out of the system, and an electronic control unit (hereinafter referred to as "ECU") 60 that controls the hydrogen supply device 20, air supply device 30 and $N_2$ storage device 50. This fuel cell system 1 is equipped to a fuel cell vehicle (not illustrated) that travels using the electric power generated by the fuel cell stack 10 to drive a motor.

The fuel cell stack (hereinafter simply referred to as "stack") 10 is a stack structure in which several tens to several hundreds of cells are layered, for example. Each fuel cell unit is configured by sandwiching a membrane electrode assembly (MEA) between a pair of separators. The membrane electrode assembly is configured by the two electrodes of an anode and a cathode, and a solid polymer electrolyte membrane sandwiched by these electrodes. Usually, both electrodes are formed from a catalyst layer contacting the solid polymer electrolyte membrane and carrying out oxidation and reduction reactions, and a gas diffusion layer contacting this catalyst layer. When hydrogen gas is supplied as fuel gas to the anode channel formed on the anode side thereof and air is supplied as oxidizing gas to a cathode channel formed on the cathode side thereof, this stack 10 generates power by way the electrochemical reaction between these.

The hydrogen supply device 20 includes a hydrogen tank 21 that stores hydrogen gas, a hydrogen supply line 22 in which the hydrogen gas supplied to the anode channel of the stack 10 flows, and a hydrogen recirculation line 23 in which the discharge gas from the anode channel flows. A hydrogen shutoff valve 24 and ejector 25 are provided in order from the hydrogen tank 21 side to the stack 10 side in the hydrogen supply line 22. The hydrogen shutoff valve 24 cuts off the supply of new hydrogen gas from the hydrogen tank 21 to the stack 10. The ejector 25 recovers hydrogenous gas discharged from the anode channel to the hydrogen recirculation line 23, and recirculates to the hydrogen supply line 22 along with hydrogen gas supplied from the hydrogen tank 21. More specifically, the hydrogen circulating system in which hydrogenous gas circulates is configured by the stack 10 side of the hydrogen supply line 22 from the hydrogen shutoff valve 24, the anode channel of the stack 10, and the hydrogen recirculation line 23.

In addition, a hydrogen purge line 26 for discharging the gas inside of the hydrogen circulating system out of the system, and a drain line 27 for discharging moisture inside of the hydrogen circulating system out of the system are provided to the hydrogen recirculation line 23 to branch therefrom. These pipes 26 and 27 are each connected to the diluter 40 described later. In addition, a hydrogen purge valve 28 and drain valve 29 are respectively provided to these pipes 26 and 27. Therefore, by opening these valves 28 and 29, gas containing impurities and moisture inside of the hydrogen circulating system are discharged out of the system via the diluter 40, and the discharge from inside of the hydrogen circulating system to outside of the system is cut off by closing these valves 28 and 29.

The air supply device 30 includes an air pump 31 that compresses air, an air supply line 32 in which air supplied from the air pump 31 to the cathode channel of the stack 10 flows, an air discharge line 33 in which discharge gas from the cathode channel flows, a humidifier 34 that recovers moisture contained in the gas flowing through the air discharge line 33 and humidifies the air inside of the air supply line 32 with this moisture, and a cathode back-pressure valve 35 that is provided in the air discharge line 33 on a downstream side from the humidifier 34 and adjusts the pressure in the cathode channel.

The $N_2$ storage device 50 includes a tubular $N_2$ storage portion 51 that connects between the humidifier 34 and the cathode back-pressure valve 35 in the air discharge line 33 and between the ejector 25 and the stack 10 in the hydrogen supply line 22, and a $N_2$ purge line 52 that branches from the hydrogen supply line 22 side of the $N_2$ storage portion 51 and leads to the diluter 40. A $N_2$ purge valve 55 is provided to the $N_2$ purge line 52.

A $N_2$ induction valve 53 that cuts off the influx of gas from the air discharge line 33 to the $N_2$ storage portion 51 is provided in the $N_2$ storage portion 51 on the air discharge line 33 side. An anode scavenging valve 54 that cuts off the influx of gas from the $N_2$ storage portion 51 to the hydrogen supply line 22 is provided in the N2 storage portion 51 on the hydrogen supply line 22. By providing the $N_2$ induction valve 53 and anode scavenging valve 54 at both ends in this way, it is possible to store discharge gas having a high nitrogen concentration discharged from the cathode channel to inside of the air discharge line 33 as an inert gas within a region in the $N_2$ storage portion 51 demarcated by these valves 53 and 54.

It should be noted that, as described in detail later, in the stop processing of the system, the inert gas stored inside of the $N_2$ storage portion 51 is introduced into the hydrogen supply line 22, which is at negative pressure, and the hydrogen circulating system is filled with this gas; therefore, the volume of this $N_2$ storage portion 51 is preferably set so as to be large compared to the volume of the hydrogen circulating system.

With the gas introduced via the air discharge line 33 and the gas introduced via the $N_2$ purge line 52 described later defined as diluent gas, the diluter 40 dilutes the hydrogenous gas discharged via the hydrogen purge line 26 or the drain line 27 using this diluent gas when the hydrogen purge valve 28 or drain valve 29 is opened, and then discharges out of the system.

A controller for driving devices such as the hydrogen shutoff valve 24, hydrogen purge valve 28, drain valve 29, air pump 31, cathode back-pressure valve 35, $N_2$ induction valve 53, anode scavenging valve 54 and $N_2$ purge valve 55 is connected to the ECU 60, and these devices operate based on control signals from the ECU 60. In addition, an ignition switch 61 for instructing the start or stop of system operation is connected to the ECU 60.

Operating Method of System

The operating method (normal electric power generation) of the fuel cell system configured as above will be explained.

In order to generate electric power with the stack 10, the hydrogen shutoff valve 24 is opened and the air pump 31 is driven, hydrogen gas is supplied from the hydrogen tank 21 to the anode channel of the stack 10, and air is supplied to the cathode channel. Herein, it is made so that the pressure in the cathode channel during electric power generation (hereinafter referred to as "cathode pressure") is controlled by adjusting the aperture of the cathode back-pressure valve 35, and the pressure in the anode channel (hereinafter referred to as "anode pressure") is adjusted depending on the cathode pressure, by a regulator (not illustrated) provided in the hydrogen supply line 22.

In addition, the impurities and generated water discharged inside the hydrogen circulating system by continuing electric power generation are discharged out of the system via the diluter 40 by opening the hydrogen purge valve 28 and the drain valve 29 as appropriate.

Stop Method of System

Next, a method to cause operation of the fuel cell system to stop will be explained.

Figure 2:
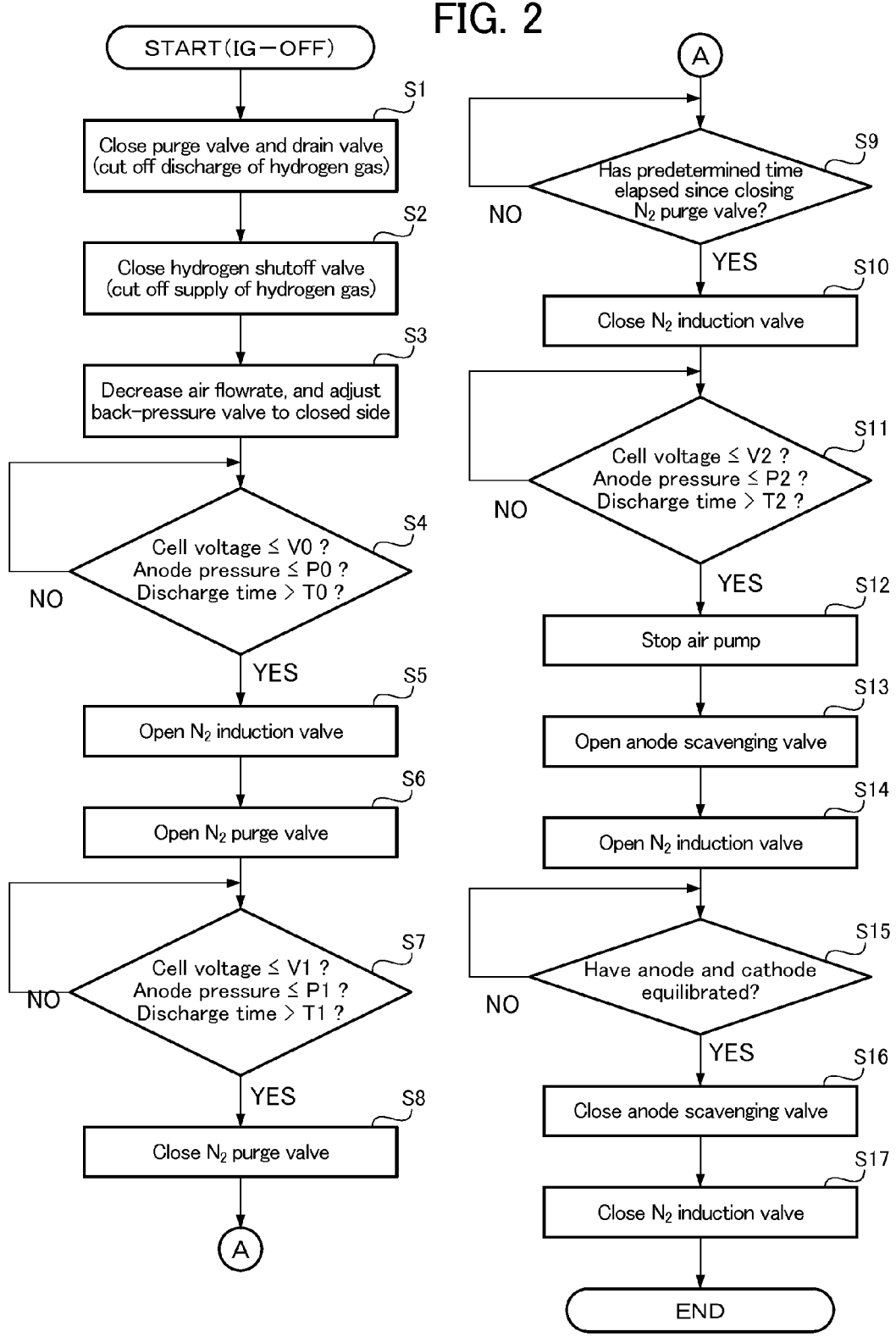
FIG. 2 is a flowchart showing a sequence of stop processing of the fuel cell system according to the embodiment.

FIG. 2 is a flowchart showing a sequence of stop processing of the system. This processing starts in response to the ignition switch being turned off while the system is operating as described above, i.e. the ECU receiving a command to make the fuel cell system stop (hereinafter referred to simply as "stop command").

First, in Step S1, in the case of the hydrogen purge valve and drain valve being open, these are closed, and the processing advances to Step S2. The discharge of gas inside of the hydrogen circulating system out of the system thereafter is thereby cut off, and the anode pressure rises. In Step S2, after waiting for the anode pressure to become higher than a predetermined discharge required pressure, the hydrogen shutoff valve closes, and the processing advances to Step S3. The supply of new hydrogen gas into the hydrogen circulating system thereafter is thereby cut off.

In Step S3, the revolution speed of the air pump is made to decline until a predetermined revolution speed during discharge, in conjunction with the supply stop of new hydrogen gas, the flowrate of air is reduced to less than during normal electric power generation and the cathode back-pressure valve is adjusted to the closed side (almost completely closed), and then the processing advances to Step S4. Electric power generation of the stack is thereby continued in a state of the supply and discharge of hydrogen gas being cut off, i.e. under the hydrogen gas remaining inside of the hydrogen circulating system and the supply of a low flowrate of air.

It should be noted that electric power generation of the stack under this hydrogen remaining inside the hydrogen circulating system and the supply of a low flowrate of air is referred to hereinafter as "discharge electric power generation". In addition to the electric power generated by the stack in this discharge electric power generation being used in the driving of the air pump and the recharging of the battery, it is consumed in a discharge resistor that is not illustrated.

In addition, after starting this discharge electric power generation in Step S3, the anode pressure and cell voltage both gradually decline due to the consumption of hydrogen inside of the hydrogen circulating system. Therefore, in the following processing, the anode pressure, cell voltage or time is used as a parameter serving as the criterion for the extent of progression of discharge electric power generation.

In Step S4, it is determined whether the cell voltage has declined to no more than a predetermined voltage V0, whether the anode pressure has declined to no more than a predetermined pressure P0, or whether a predetermined time T0 has elapsed since the start of discharge electric power generation. In the case of all in this determination being NO, discharge electric power generation is continued in the same state without interruption.

In the case of any in Step S4 being YES, the processing advances to Step S5 in response to the discharge electric power generation being determined as having progressed to a certain extent. In Step S5, the $N_2$ induction valve is opened in order to store the inert gas inside of the air discharge line inside of the $N_2$ storage portion, and in Step S6, the $N_2$ purge valve is opened. The gas remaining in the $N_2$ storage portion is thereby discharged out of the system via the diluter along with the inert gas introduced from the air discharge line. In other words, the gas inside of the $N_2$ storage portion is replaced with inert gas. Until the discharge electric power generation progresses to a certain extent, and the nitrogen concentration of the gas inside of the air discharge line increases in this way (until the determination in Step S4 becomes YES), the $N_2$ induction valve is kept closed, and the gas inside of the air discharge line is discharged out of the system via the cathode back-pressure valve without introducing to the $N_2$ storage portion.

In Step S7, it is determined whether the cell voltage has declined to no more than a predetermined voltage V1, whether the anode pressure has declined to no more than a predetermined pressure P1, or whether a predetermined time T1 has elapsed since the start of discharge electric power generation. Herein, the above-mentioned thresholds V1 and P1 are both set to values smaller than the thresholds V0 and P0 of Step S4, and the threshold T1 is set to a value larger than the threshold T0 of Step S4. In the case of all in Step S7 being determined as NO, the replacement of gas inside of the $N_2$ storage portion is further continued.

In the case of any in Step S7 being determined as YES, i.e. in the case of the replacement of gas inside the $N_2$ storage portion being started in Step S6, and then discharge electric power generation being determined as having further progressed, it is determined that the gas inside of the $N_2$ storage portion has been sufficiently replaced; in order words, it is determined that the oxygen concentration of the gas inside the $N_2$ storage portion has also sufficiently lowered, and the processing advances to Step S8. In Step S8, the $N_2$ purge valve closes, and the processing advances to Step S9. The discharge of gas inside the $N_2$ storage portion to outside the system is thereby stopped, and the filling of inert gas into the $N_2$ storage portion begins.

In Step S9, it is determined whether a predetermined time has elapsed since closing the $N_2$ purge valve. In the case of the determination in Step S9 being YES, it is determined that a sufficient amount of inert gas has filled inside of the $N_2$ storage portion, and after advancing to Step S10 and closing the $N_2$ induction valve, the processing advances to Step S11. In the case of the determination in Step S9 being NO, the $N_2$ induction valve continues to be kept open, and the filling of inert gas into the $N_2$ storage portion continues.

In Step S11, it is determined whether the cell voltage has declined to no more than a predetermined voltage V2, whether the anode pressure has declined to no more than a predetermined pressure P2, or whether a predetermined time T2 has elapsed since starting discharge electric power generation. Herein, the above-mentioned thresholds V2 and P2 are both set to values less than the thresholds V1 and P1 of Step S7, and the threshold T2 is set to a value larger than the threshold T1 of Step S7. In the case of all in Step S11 being determined as NO, discharge electric power generation is continued without interruption. In the case of any in Step S11 having been determined as YES, the processing advances to Step S12, the discharge electric power generation ends by setting the revolution speed of the air pump to "0" and completely stopping the supply of air, and then the processing advances to Step S13.

In Step S13, the anode scavenging valve is opened, then in Step S14, the $N_2$ induction valve is also opened, and the processing advances to Step S15. The hydrogen supply line, $N_2$ storage portion, and air discharge line are thereby in communication, and the inert gas inside of the $N_2$ storage portion is introduced into the hydrogen circulating system, which is at negative pressure from the discharge electric power generation being continued from Step S3 to Step S11, and the anode pressure begins to rise until equilibrating with the cathode pressure, which is substantially equal to atmospheric pressure.

In Step S15, it is determined whether the anode pressure and cathode pressure have equilibrated. Although this determination in Step S15 may determine directly based on the output of pressure sensors that are not illustrated, since it is considered that the anode pressure and cathode pressure approach the equilibrated state quickly, it may indirectly determined based on the time elapsed since opening the $N_2$ induction valve in Step S14. In the case of the determination in Step S15 being NO, the anode scavenging valve and $N_2$ induction valve continue to be opened until it can be determined that the anode pressure has become equal to the cathode pressure.

In the case of the determination in Step S15 being YES, it is determined that the introduction of inert gas to the hydrogen circulating system has completed, the processing advances to Step S16 and closes the anode scavenging valve, then in Step S17, also closes the $N_2$ induction valve, and this stop processing is ended.

Figure 3:
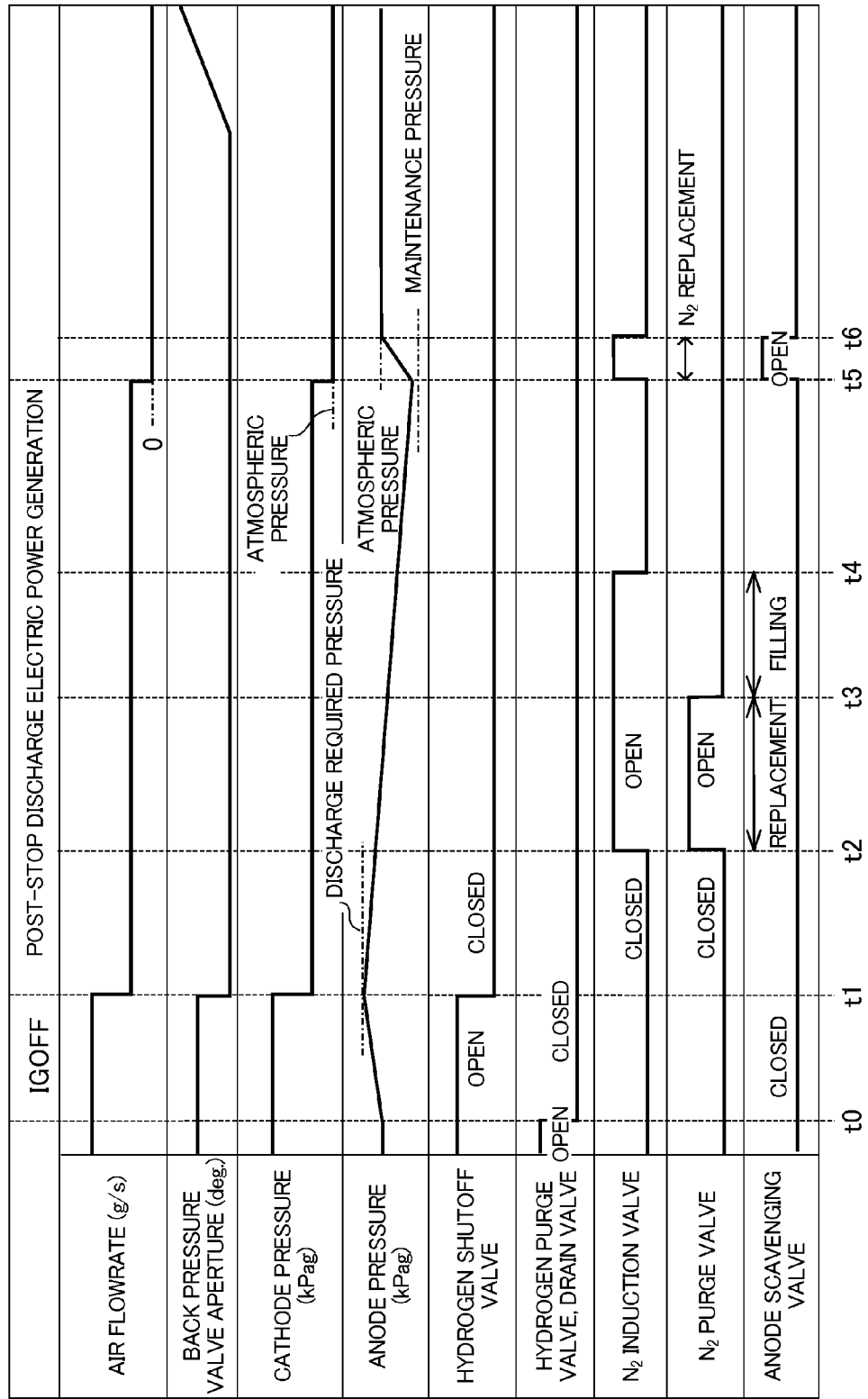
FIG. 3 is a time chart of the stop processing.

Next, the above such stop processing will be explained while referencing the time chart of FIG. 3. In FIG. 3, in addition to the mass flowrate (g/s) of air supplied to the cathode from the air pump, aperture (deg.) of the cathode back-pressure valve, and cathode pressure (kPag) and anode pressure (kPag), the open/closed states of the hydrogen shutoff valve, hydrogen purge valve, drain valve, $N_2$ induction valve, $N_2$ purge valve and anode scavenging valve are shown. Furthermore, a case of the ignition switch being turned off at time t0 is illustrated in FIG. 3.

First, at time t0, the hydrogen purge valve and the drain valve are both closed in response to the ignition switch having been turned off, and the discharge of gas inside of the hydrogen circulating system is cut off (refer to Step S1). Subsequently, the anode pressure rises due to cutting off discharge, the hydrogen shutoff valve is closed in response to rising to a discharge required pressure at time t1, and the supply of new hydrogen gas is stopped (refer to Step S2). In addition, at time t1, in conjunction with the closing of this hydrogen shutoff valve, the aperture of the cathode back-pressure valve is controlled to the closed side along with the revolution speed of the air pump being decreased, whereby the air flowrate and cathode pressure decrease (refer to Step S3). Discharge electric power generation under a low flowrate of air thereby begins, and the anode pressure gradually decreases from time t1. It should be noted that the discharge required pressure for determining the timing to close the hydrogen shutoff valve is a threshold set in order to prevent the anode pressure when the discharge electric power generation ends (refer to time t5) from falling below a maintenance pressure established to protect the stack.

After discharge electric power generation is started at time t1, the $N_2$ induction valve and $N_2$ purge valve are opened at time t2 in response to it having been determined that the nitrogen concentration of the gas discharged from the stack having sufficiently risen due to the discharge progressing to a certain extent, whereby the replacement inside of the $N_2$ storage portion by inert gas begins (refer to Steps S4 to S6). Subsequently, only the $N_2$ purge valve is closed at time t3 in response to it having been determined that inside of the $N_2$ storage portion has been sufficiently replaced, whereby the filling of inert gas to inside of the $N_2$ storage portion begins (refer to Steps S7 and S8). At time t4 when a predetermined time has elapsed since starting this $N_2$ filling, the $N_2$ induction valve is also closed, whereby the inert gas discharged from the stack during discharge electric power generation is trapped inside the $N_2$ storage portion (refer to Steps S9 and S10).

At time t5, the air pump is stopped (refer to Step s12) in response to it having been determined as having reached a time to end discharge electric power generation (refer to Step S11). The air flowrate thereby becomes "0", and the cathode pressure declines to atmospheric pressure. Furthermore, at time t5, the $N_2$ induction valve and anode scavenging valve are both opened in response to having ended discharge electric power generation. The inert gas being stored inside of the $N_2$ storage portion, i.e. the inert gas discharged from the stack during discharge electric power generation, is introduced to the anode, which is at negative pressure from performing discharge electric power generation (refer to Steps S13 and S14), and the anode pressure rises from the negative pressure state to the cathode pressure, which is almost equal to atmospheric pressure. Subsequently, at time t6, the $N_2$ induction valve and anode scavenging valve are both closed in response to the anode pressure rising, and it having been determined that the anode pressure and cathode pressure have become substantially equal, whereby the introduction of inert gas is stopped. The replacement of the anode channel with inert gas thereby finishes.

There are the following effects according to the present embodiment.

(1) With the present embodiment, after a stop command, the gas discharged to the air discharge line while continuing electric power generation is introduced to the hydrogen supply line, which is at negative pressure after the end of the above-mentioned electric power generation, via the $N_2$ storage portion. The hydrogen concentration and oxygen concentration thereby lower and the anode channel is filled by inert gas having a high nitrogen concentration, and thus it is possible to have the system stop in a state sealing the hydrogen supply line and the hydrogen recirculation line; therefore, it is possible to prevent degradation due to oxygen mixing with hydrogen in the anode channel during system stop, and degradation due to reactivating the system in a state in which both electrodes are filled with air.

In addition, inert gas filling the anode channel was introduced from the air discharge line using the negative pressure; therefore, it is possible to make the system stop in a state in which the cathode channel is also filled with the same inert gas as the anode channel. More specifically, by establishing a state in which the anode channel and the cathode channel are both filled with inert gas, the reaction from remaining gas will almost not progress; therefore, it is possible to more effectively suppress degradation than in a case of filling only the anode channel with inert gas.

It should be noted that, after completion of the replacement of the anode channel with inert gas (from t6 in FIG. 3), the inert gas being filled to the cathode channel side is gradually discharge out of the system, and finally comes to be replaced with air having a high oxygen concentration. However, even in such a case, while inert gas on the cathode side is replaced by air, it goes without saying that a state in which degradation is particularly effectively suppressed as described above is maintained; however, so long as the state in which the anode channel side is filled with inert gas is being maintained, the effect of suppressing degradation will not be impaired also after the inert gas has been replaced with air.

In addition, according to the present invention, since the gas discharged from the cathode channel while continuing electric power generation after the stop command is appropriated as inert gas, there is no need to newly provide a device for generating inert gas. In particular, it has been verified that the oxygen concentration of the gas discharged from the stack to the air discharge line during the aforementioned such discharge electric power generation, i.e. during electric power generation cutting off the supply and discharge of hydrogen gas and with a supply of very low flowrate air, is sufficiently low compared to during normal electric power generation and is qualified as an inert gas. In addition, the required amount of inert gas for stopping is sufficient so long as appropriating the gas discharged by continuing electric power generation each time; therefore, since the volume of the $N_2$ storage portion is sufficient so long as the size corresponding to the required amount in stopping one time can be ensured, the effect on size reduction will also be great compared to a case of using a nitrogen gas cylinder.

Furthermore, by continuing electric power generation in a state cutting off the supply and discharge of gas, i.e. a state closing the hydrogen circulating system, the anode pressure at the end of the continuance of electric power generation becomes sufficiently lower than the cathode pressure. Therefore, since it is possible to employ this negative pressure upon introducing the above-mentioned inert gas via the $N_2$ storage portion, devices such as a pump for supplying the gas of the $N_2$ storage portion against the anode pressure also become especially unnecessary.

(2) In the present embodiment, upon introducing inert gas via the $N_2$ storage portion to an anode channel side, the gas remaining inside of the $N_2$ storage portion is discharged along with gas introduced from the air discharge line out of the system via the $N_2$ purge channel, until the oxygen concentration of the gas inside of the $N_2$ storage portion is determined as being no more than a predetermined concentration. It is thereby made so that only inert gas having a sufficiently low oxygen concentration is stored in the $N_2$ storage portion, whereby it is possible to prevent oxygen from being introduced to the anode channel side.

(3) With the present embodiment, inert gas is filled to the $N_2$ storage portion in a state in which the anode scavenging valve is closed, and the scavenging valve is opened in response to discharge electric power generation having ended, and the inert gas inside of the $N_2$ storage portion is introduced into the hydrogen supply line. By closing the anode scavenging valve and establishing a state in which the hydrogen supply line and $N_2$ storage portion are cut off until introducing gas into the hydrogen supply line in this way, it is possible to cause a pressure differential to arise between the inside of the hydrogen supply line and the $N_2$ storage portion until opening the anode scavenging valve; therefore, inert gas can be introduced in a short time without using a new device.

(4) With the present embodiment, after a system stop command, the anode pressure at the end of discharge electric power generation can be prevented from declining to an extent at which the fuel cell is damaged, by the anode pressure becoming higher than a discharge required pressure and then closing the hydrogen shutoff valve.

(5) According to the present embodiment, by discharging the gas inside of the air discharge line to outside of the system without storing in the $N_2$ storage portion, immediately after the start of discharge electric power generation at which the nitrogen concentration of the gas inside of the air discharge line is considered to be relatively low, it is possible to store inert gas having a high nitrogen concentration in the $N_2$ storage portion.

(6) According to the present embodiment, by introducing the inert gas inside of the $N_2$ storage portion until the anode pressure and cathode pressure become substantially equal, it is possible to prevent a differential pressure arising across the electrolyte membrane in the stack and strain acting thereon during system stop.

Second Embodiment

Figure 4:
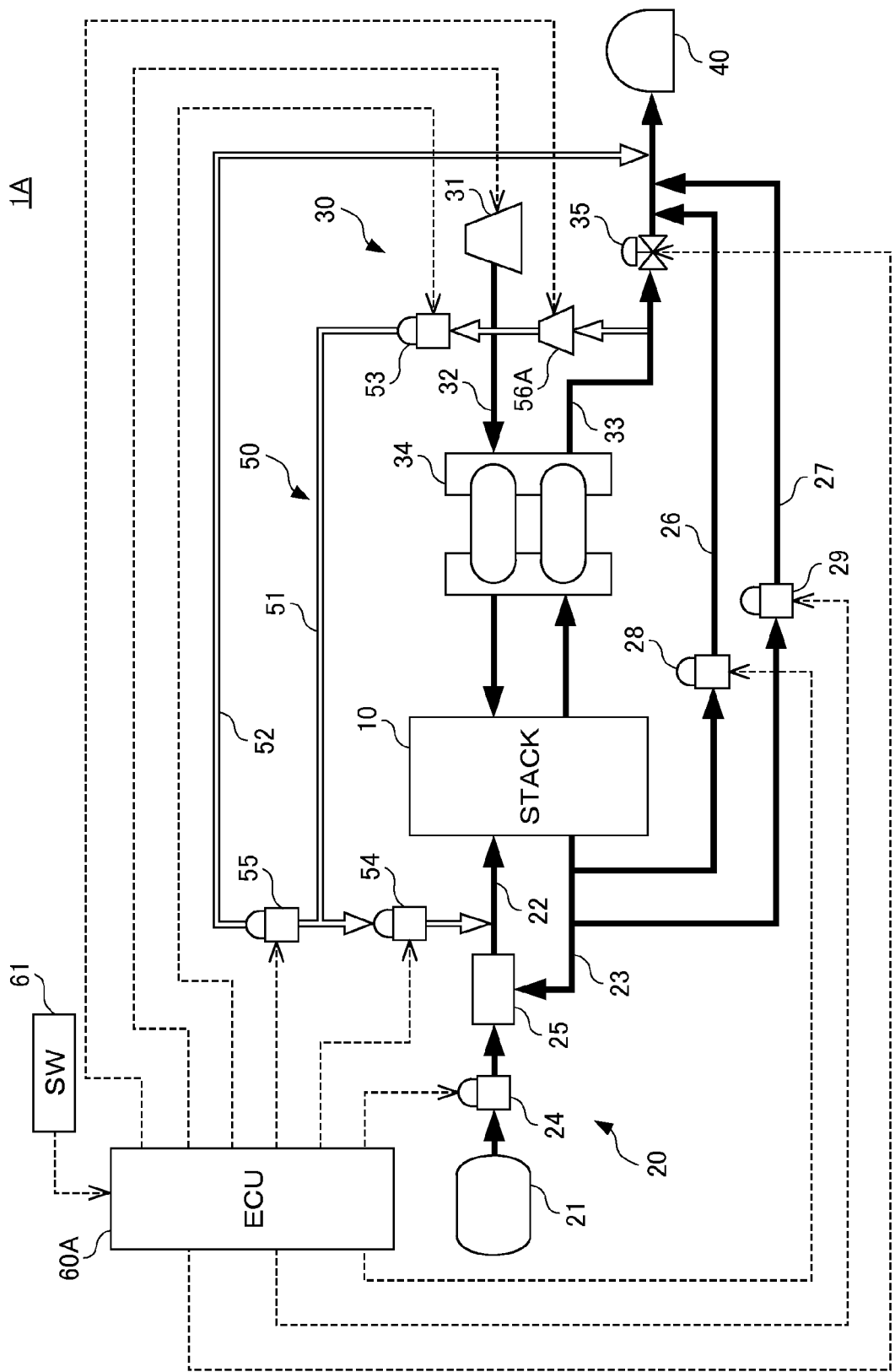
FIG. 4 is a block diagram schematically showing the configuration of a fuel cell system according to a second embodiment of the present invention.

Next, a second embodiment of the present invention will be explained. It should be noted that the same reference symbols are assigned for configurations that are the same as the first embodiment, and detailed explanations thereof will be omitted. FIG. 4 is a block diagram schematically showing the configuration of a fuel cell system 1A according to the present embodiment.

The fuel cell system 1A according to the present embodiment differs from the first embodiment in the configuration of a $N_2$ storage device 50A. More specifically, the $N_2$ storage device 50A of the present embodiment differs from the above-mentioned first embodiment in the aspect of further including a compressor 56A that compresses the gas inside of the air discharge line 33 so as to supply the $N_2$ storage portion 51.

In the fuel cell system 1A including the above such $N_2$ storage device 50A, an ECU 60A drives the compressor 56A at the same timing as the opening of the $N_2$ induction valve 53 in the stop processing, and compresses the gas inside the air discharge line 33 into the $N_2$ storage portion 51.

There are the following effects according to the present embodiment.

(7) According to the present invention, it is possible to store a sufficient amount of inert gas for introducing to the hydrogen circulating system inside of the $N_2$ storage portion, by filling the gas inside the air discharge line into the $N_2$ storage portion using a compressor. In addition, by using such a compressor, it is also possible to reduce the volume of the $N_2$ storage portion.

It should be noted that the present invention is not to be limited to the above-mentioned embodiments, and that modifications, improvements, etc. within a scope that can achieve the object of the present invention are included in the present invention.

For example, although a tubular arrangement is employed as the $N_2$ storage portion 51 that stores inert gas discharged from the cathode channel during electric power generation in the above-mentioned embodiments, the present invention is not limited thereto. The shape of the $N_2$ storage portion may be any shape so long as being able to efficiently store inert gas. In addition, in order to ensure sufficient volume, a box-shaped buffer may be provided to the $N_2$ storage portion.

What is claimed is:

1. A method for stopping a fuel cell system that includes:
  a fuel cell that generates electric power by supplying fuel gas to an anode and supplying oxidizing gas to a cathode;
  a fuel gas supply channel in which fuel gas supplied to the anode flows;
  a fuel gas discharge channel in which anode discharge gas from the anode flows;
  an oxidizing gas discharge channel in which cathode discharge gas from the cathode flows;
  an inert gas storage portion that connects the oxidizing gas discharge channel and the fuel gas supply channel;
  a supply shutoff valve that is provided to the fuel gas supply channel and cuts off new supply of fuel gas to the anode;
  a discharge shutoff valve that is provided to the fuel gas discharge channel and cuts off discharge of anode discharge gas from the anode to outside of the system; and
  an influx shutoff valve that cuts off influx of cathode discharge gas from the inert gas storage portion to the fuel gas supply channel,
  the method comprising the steps of:
  cutting off new supply of fuel gas to the anode and discharge of anode discharge gas from the anode to outside of the system by closing the supply shutoff valve and the discharge shutoff valve, after a stop command for the fuel cell system;
  continuing electric power generation by using the fuel gas remaining in the fuel gas discharge channel, the fuel gas discharge channel and the anode, and reducing a pressure inside the anode by way of the fuel cell in a state in which the supply of fuel gas to the anode and the discharge of anode discharge gas from the anode are cut off by closing the supply shutoff valve and the discharge shutoff valve according to the step of cutting off;
  closing the influx shutoff valve, and storing, in the inert gas storage portion, inert gas discharged from the cathode to the oxidizing gas discharge channel in the step of continuing electric power generation; and
  opening the influx shutoff valve while closing the supply shutoff valve and the discharge shutoff valve, thereby introducing inert gas stored inside of the inert gas storage portion to inside of the fuel gas supply channel, after the step of continuing electric power generation.

2. The method for stopping a fuel cell system according to claim 1, wherein the supply and discharge are cut off by closing the supply shutoff valve and the discharge shutoff valve in the step of cutting off, in a case of pressure inside of the fuel gas supply channel having risen to a predetermined pressure.

3. The method for stopping a fuel cell system according to claim 2, further comprising a step of discharging inert gas discharged to the oxidizing gas discharge channel to outside of the system, in a period from starting the step of continuing electric power generation until starting the step of storing inert gas.

4. The method for stopping a fuel cell system according to claim 3, wherein the introduction of inert gas inside of the inert gas storage portion is stopped in the step of introducing inert gas, in response to the pressure of the anode becoming substantially equal to pressure of the cathode.

5. The method for stopping a fuel cell system according to claim 1, further comprising a step of discharging inert gas discharged to the oxidizing gas discharge channel to outside of the system, in a period from starting the step of continuing electric power generation until starting the step of storing inert gas.

6. The method for stopping a fuel cell system according to claim 5, wherein the introduction of inert gas inside of the inert gas storage portion is stopped in the step of introducing inert gas, in response to the pressure of the anode becoming substantially equal to pressure of the cathode.

7. The method for stopping a fuel cell system according to claim 1, wherein the introduction of inert gas inside of the inert gas storage portion is stopped in the step of introducing inert gas, in response to the pressure of the anode becoming substantially equal to pressure of the cathode.

* * * * *